United States Patent
Yano et al.

(10) Patent No.: US 7,389,623 B2
(45) Date of Patent: Jun. 24, 2008

(54) SEAL APPARATUS

(75) Inventors: Keiji Yano, Susono (JP); Kozo Yoshida, Gotemba (JP); Takashige Yano, Kawasaki (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/497,649

(22) PCT Filed: Dec. 3, 2002

(86) PCT No.: PCT/JP02/12622

§ 371 (c)(1),
(2), (4) Date: Jun. 5, 2005

(87) PCT Pub. No.: WO03/047978

PCT Pub. Date: Jun. 12, 2003

(65) Prior Publication Data

US 2005/0241277 A1    Nov. 3, 2005

(30) Foreign Application Priority Data

Dec. 5, 2001 (JP) ............................. 2001-370935

(51) Int. Cl.
*B65B 51/10* (2006.01)
(52) U.S. Cl. .................. 53/374.2; 53/374.8; 53/552; 53/477; 493/209
(58) Field of Classification Search .................. 53/373, 53/374.2, 550–552, 558, 373.7, 374.8, 477; 493/194, 209
See application file for complete search history.

(56) References Cited

U.S. PATENT DOCUMENTS

| | | | | |
|---|---|---|---|---|
| 4,288,968 A | * | 9/1981 | Seko et al. | 53/550 |
| 4,630,429 A | | 12/1986 | Christine | |
| 4,747,253 A | * | 5/1988 | Schulte | 53/433 |
| 4,807,426 A | * | 2/1989 | Smith | 53/550 |
| 5,015,223 A | * | 5/1991 | Boeckmann | 493/194 |
| 5,067,302 A | * | 11/1991 | Boeckmann | 53/374.8 |
| 5,649,407 A | * | 7/1997 | Blomqvist | 53/374.8 |
| 6,871,476 B2 | * | 3/2005 | Tobolka | 53/374.2 |

FOREIGN PATENT DOCUMENTS

| | | |
|---|---|---|
| JP | 62-501902 | 7/1987 |
| JP | 8-230834 | 9/1996 |
| WO | 86/04559 | 8/1986 |

\* cited by examiner

*Primary Examiner*—Thanh K. Truong
(74) *Attorney, Agent, or Firm*—Buchanan Ingersoll & Rooney PC (57) ABSTRACT

The sealing apparatus comprises (a) a heat seal jaw, (b) a heat seal bar having two heaters arranged in parallel, being provided in a front edge of said heat seal jaw and having a working surface, (c) a counter jaw disposed oppositely to the heat seal jaw, (d) a counter rail provided to said counter jaw and having the working surface, (e) a drive means for advancing/retracting the heat seal jaw and counter jaw relatively, (f) a heating means for actuating the heaters while clamping a packaging material by the working surface of the heat seal bar and the working of the counter rail and, (g) a cutter section comprising of a cutter disposed at the position between the two heaters and a resilient counter cutter, and is characterized in that the counter cutter is held by a holding section provided on the working surface of the heat seal bar or the counter rail and projecting from the holding working surface.

The seal apparatus can improve hygiene and the flap formation of the packaging container.

10 Claims, 9 Drawing Sheets

SEAL APPARATUS

TECHNICAL FIELD

This invention relates to seal apparatus.

BACKGROUND ART

In conventional manufacture of packaging container filling liquid food such as milk, soft drinks and like, web-like packaging materials comprising flexible laminate material are in-fed to a filling machine. In the filling machine, the packaging material is sealed along the longitudinal direction, and is formed as tube like shape. While the tube-shaped packaging material is transported downward continually, liquid food is filled up upward. The tube-shaped packaging material is transferred to a seal apparatus, and is transversal-sealed in predefined interval While being clamped by the seal units from both sides, in the seal apparatus. By cutting the transversal-sealed portion, then a plurality of preliminary containers filled up predefined amount of liquid food are formed, and the preliminary container is formed into a final packaging container. The seal units face each other and have a counter jaw and a heat seal jaw disposed with freely forward/backward moving. The counter rail and the heat seal bar are disposed to the counter jaw and the heat seal jaw, respectively.

Figure 3:
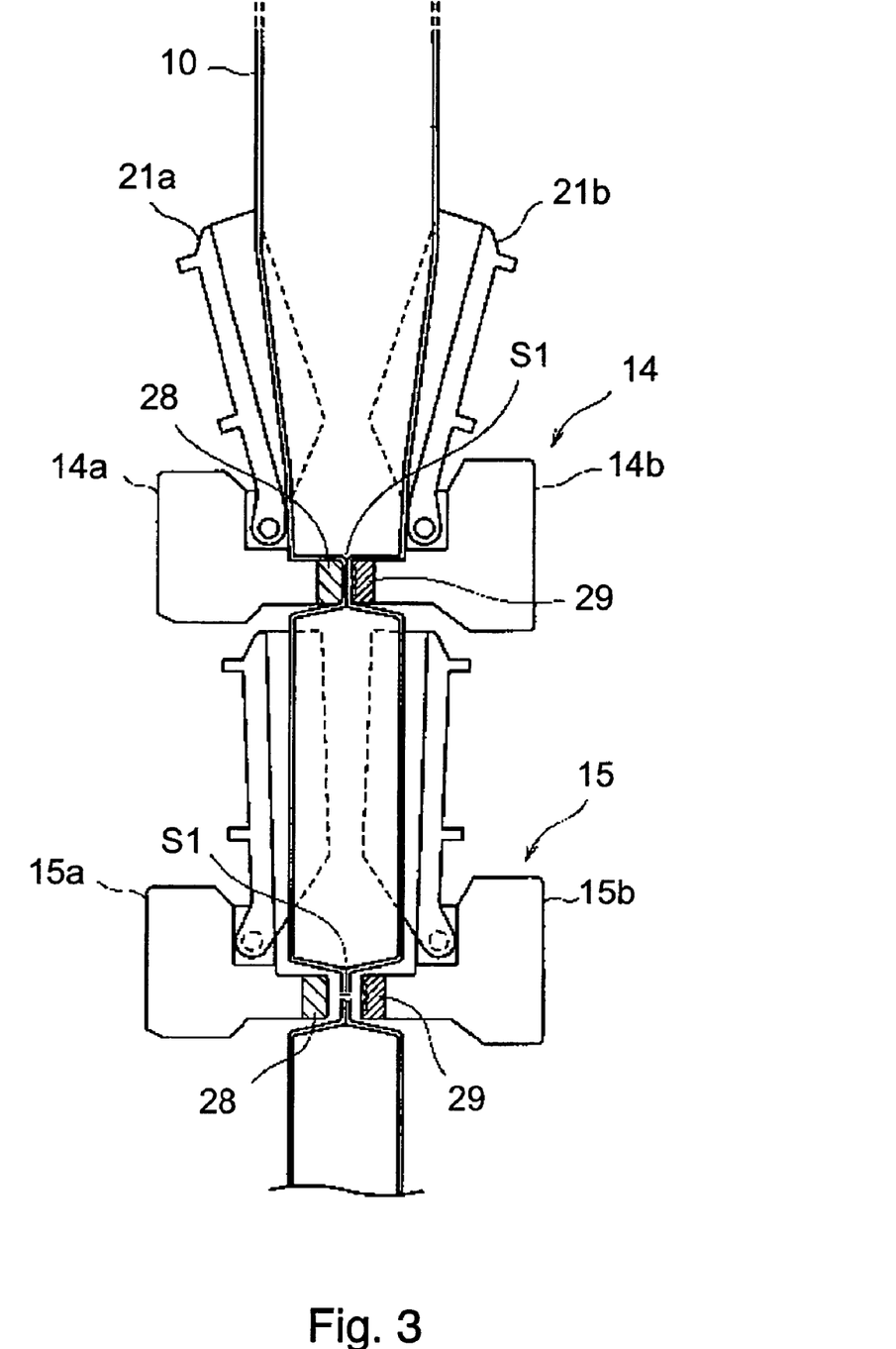
FIG. 3 is a schematic illustration of a seal apparatus for transverse sealing the packaging material filled up with contents liquid.

FIG. 3 is a sketch drawing of a seal apparatus for transverse sealing the packaging material filled up with contents liquid.

Figure 5:
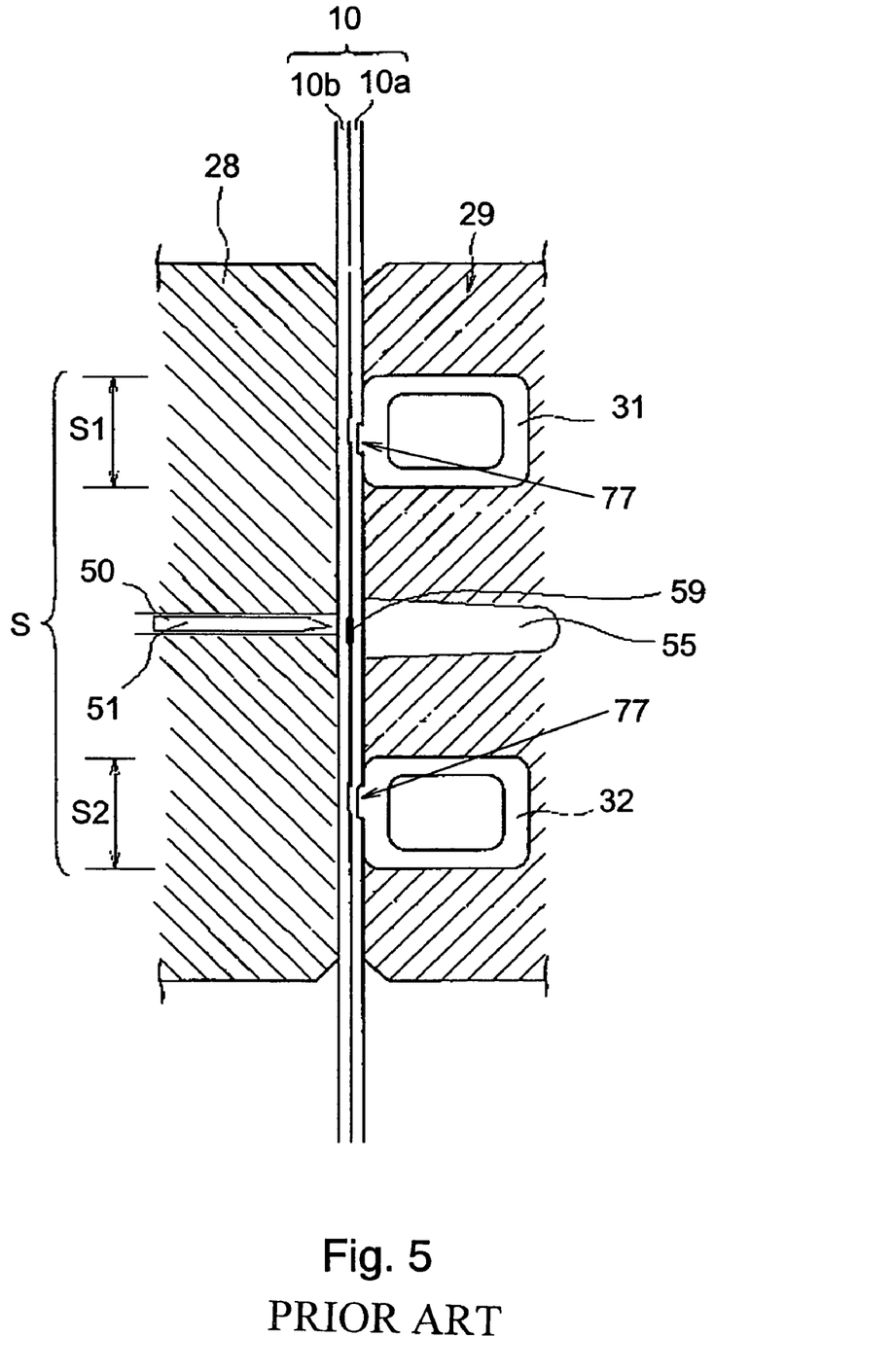
FIG. 5 is an illustration of a cutter counter section according a conventional seal unit.

FIG. 5 is an illustration of a cutter counter section according a conventional seal unit.

Figure 6:
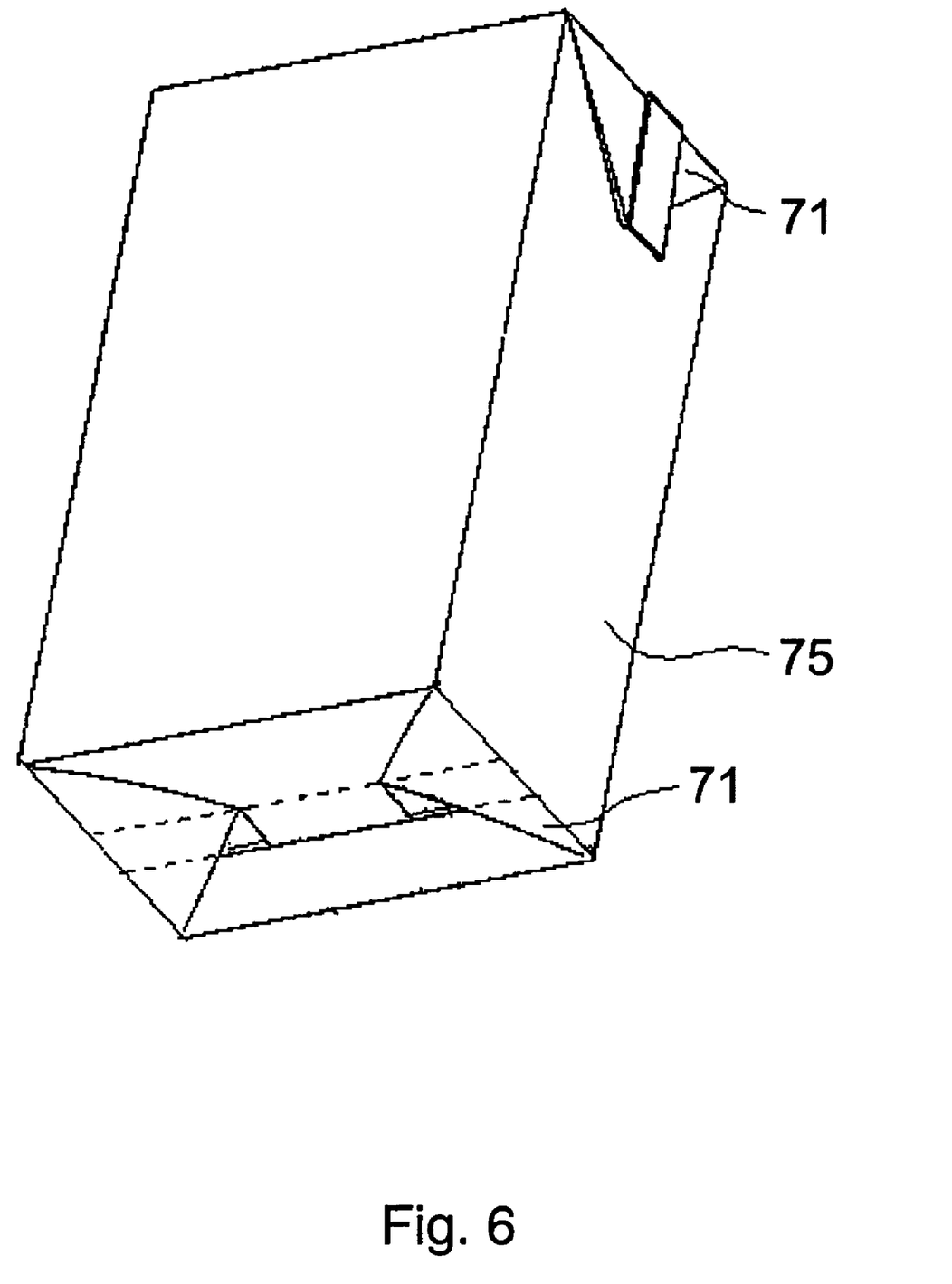
FIG. 6 is a perspective view showing flap folding of the container filled up with contents liquid.

FIG. 6 is a perspective view showing flap holdings of the container filled up with contents liquid.

In the views, the reference numeral 28 indicates the counter rail, the reference numeral 29 indicate the heat seal bar.

The web-shaped packaging materials 10 in two sheets are clamped between a working surface of the counter rail 28 and a working surface of the heat seal bar 29.

In the working face facing against the counter rail 28 in the heat seal bar 29, the first, the second induction heaters 31, 32, having the predefined intervals up and down, facing the packaging material 10 and having convex projection 77 are disposed.

In this case, the packaging material 10 is clamped with the counter rail 28 and the heat seal bar 29 and is sealed transversally with pushing and heating by advancing forward the packaging material 10 each other.

The packaging material 10 has a laminate structure comprising of a polyethylene layer, an aluminum foil layer, an adhesive layer, a paper substrate and a polyethylene layer in order to outside from inside of the formed packaging container.

Therefore, the packaging materials 10 in two sheets are clamped with the counter rail 28 and the heat seal bar 29, and is heated by impressing seal voltage to the first, the second induction heaters 31, 32 with convex projections 77.

The innermost polyethylene layer in the first portion 10a and the innermost polyethylene layer in the second portion 10b of the packaging material 10 are pushed and melted each other mainly in an area corresponding to the first, the second induction heaters 31, 32.

Impressing of the seal voltage to the first, the second induction heaters 31, 32 is stopped and the corresponding portion of the first, the second induction heaters 31, 32 are cooled.

A seal portion S comprising of the first, the second transverse sealing portion S1, S2 are formed in the portion corresponding to the first, the second induction heaters 31, 32 in the first portion 10a and the second portion 10b.

Subsequently, the seal section S is cut with a cutter section 50, and a container is formed.

In the cutter section, a groove 55 is formed on the working surface of the heat seal bar 29 in order to prevent any deterioration of the cutter 51 when the cutter 51 built-in to the counter rail 28 cuts the packaging material 10 (10a and 10b).

In the conventional seal apparatus, the groove 55 is formed on the working surface of the heat seal bar 29 and/or the heat sea jaw so as not to damage the point of the cutter 51 when the cutter in the counter section cuts the packaging material 10 (10a and 10b). Therefore, however, when the packaging materials 10 are pushed by the working surface of the counter rail 28 and the working of the heat seal bar 29 for the transverse sealing, because of no back pressure of the portion of the packaging material 10 corresponding to the groove 55, the contents liquid remains as stagnant liquid 59 between the packaging materials 10a and 10b corresponding to cutter recess portion 55.

Therefore, the liquid of the stagnant liquid might unsanitarily decompose before consumer's use because the stagnant liquid 59 remains at the section S of the packaging material separated individually.

Moreover, when flap 71 adheres to the container wall in the formation of the container as shown in FIG. 6, an adhesiveness of the flap decrease in case the liquid of the stagnant liquid pollutes the adhesive area.

DISCLOSURE OF THE INVENTION

This invention solves problems of the conventional seal apparatus, and aims to provide with the seal apparatus that can improve hygiene and container formation of the packaging container.

In the seal apparatus of this invention to solve a problem, the sealing apparatus comprises (a) a heat seal jaw, (b) a heat seal bar having two heaters arranged in parallel, being provided in a front edge of said heat seal jaw and having a working surface, (c) a counter jaw disposed oppositely to the heat seal jaw, (d) a counter rail provided to said counter jaw and having the working surface, (e) a drive means for advancing/retracting the heat seal jaw and counter jaw relatively, (f) a heating means for actuating the heaters while clamping a packaging material by the working surface of the heat seal bar and the working of the counter rail and, (g) a cutter section comprising of a cutter disposed at the position between the two heaters and a resilient counter cutter, and Is characterized in that the counter cutter is held by a holding section provided on the working surface of the heat seal bar or the counter rail and projecting from the holding working surface.

In the preferable embodiment of the invention, the counter cutter is mounted by fitting with the holding section.

In the preferable embodiment of the invention, the counter cutter projects from the working surface with a sectional chevron shape.

In the preferable embodiment of the invention, the counter cutter projects from the working surface with a sectional rectangle shape.

BEST MODE FOR CARRYING OUT THE INVENTION

Modes of this invention are described in detail as follows, referring to drawing. In FIGS. 1, 2, 3 and 4, the tube-shaped packaging material 10 comprising flexible laminated material is formed by curving the web-shaped packaging material 11, 12 and sealing both edges in longitudinal direction.

The packaging material 10 is carried underneath continually to the seal apparatus, in the seal apparatus, and is clamped by two seal units 14, 15 in the predetermined interval, and a seal portion S is formed by a transverse sealing. In the meantime, liquid food is filled up upward in the packaging material 10. Both seal units 14, 15 have the counter jaw 14a, 15a and the heat seal jaw 14b, 15b. Counter jaws 14a, 15a is oppositely disposed to heat seal jaws 14b, 15b.

In the counter rail 28 installed on the front edge of the counter jaw 14a, 15a and the heat seal bar 29 installed on the front edge of the counter jaw 14b, 15b, a cylinder (not shown) as a drive means which relatively advancing. and retreating (right and left direction in FIG. 3) the heat seal jaws 14b, 15b and counter jaws 14a, 15a is mounted.

A pair of forming flaps 21a, 21b supported with freely rocking by the counter jaws 14a, 15a and the heat seal jaw 14b and guiding the packaging material 10, and forms the packaging material 10 into rectangular-shape.

As shown in FIG. 3, the seal unit 14 clamps the packaging material 10 from both sides by advancing the counter jaw 14a and the heat seal jaw 14b to the packaging material 10 from a seal starting position.

The seal unit 14 moves downward with clamping the packaging material 10, the heat seal bar 29 and the counter rail 28 strongly pressures the seal portion S, heat seal bar 29 heat generates heat in an aluminum foil layer of packaging material 10 by induction heating, and the packaging material 10 is transverse sealed.

The sealing by the seal unit 14 is finished when the seal unit 15 moves to the seal starting position, and the counter jaw 15a and the heat seal jaw 15b begins to start ahead.

In this way, after sealing and cutting the packaging material 10 in the middle of each seal portion S with the cutter of the cutter section a preliminary container is formed.

Figure 4:
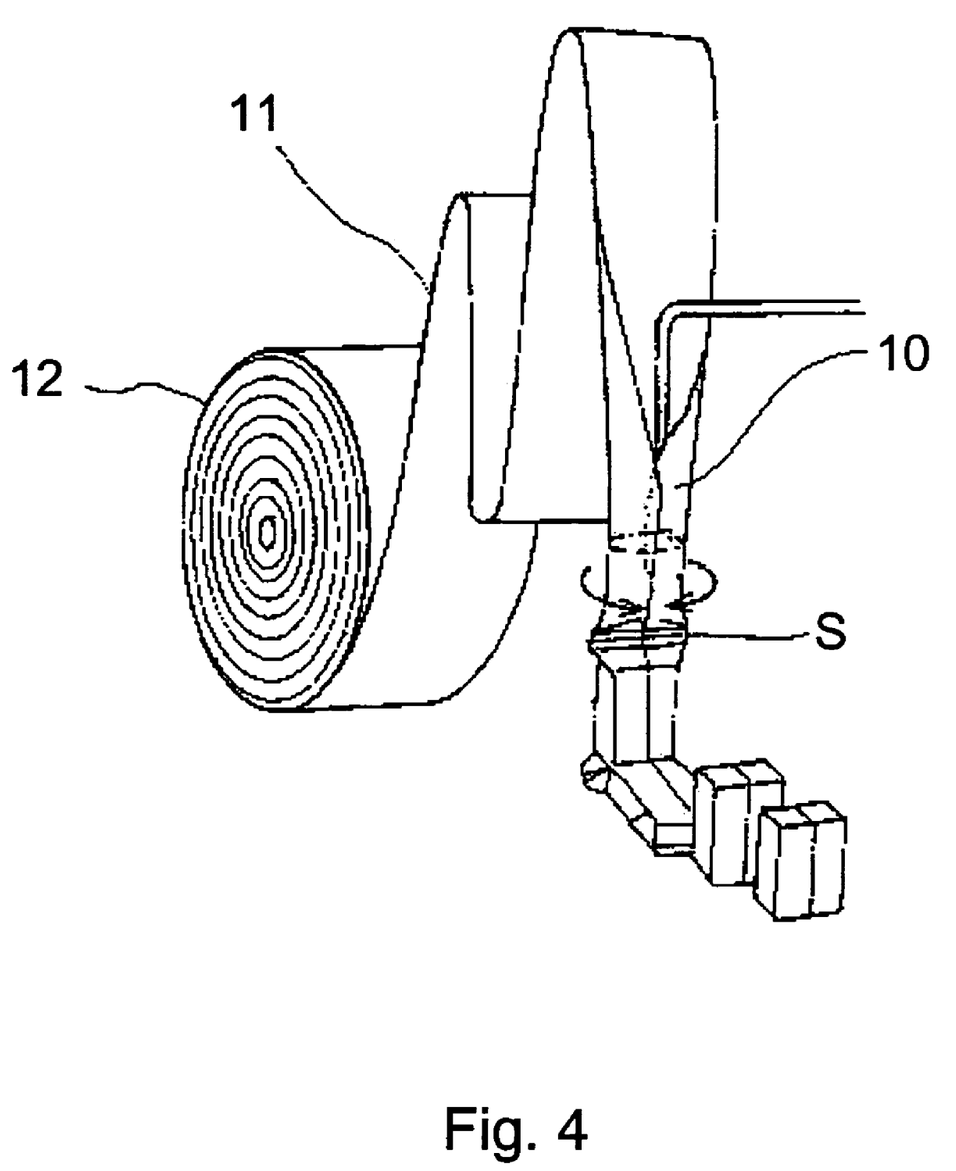
FIG. 4 is an explanatory drawing of the container formed by transverse sealing after filling up the contents liquid into the longitudinal-sealed packaging material.

A preliminary container is finally formed a desired container by transferring to a forming section (not shown in the figures), forming to the predetermined shape, and being adhered flaps to top and bottom of the container.

Figure 1:
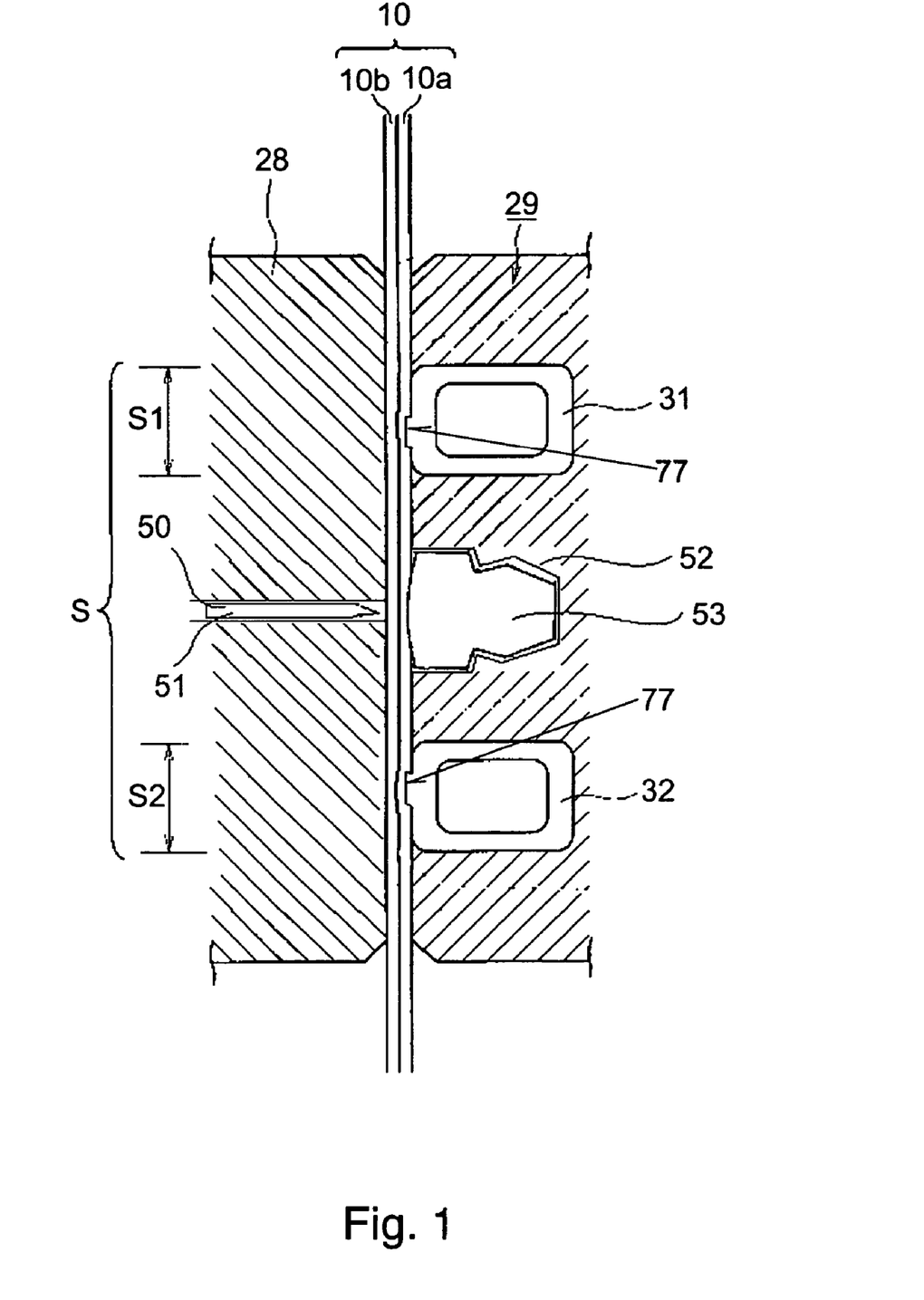
FIG. 1 is an explanatory drawing of the cutter part in accordance with the seal apparatus in an embodiment of this invention.

The seal method by the seal units 14, 15 are described hereinafter. In FIG. 1, the packaging materials 10 in two sheets between the working surface of the counter rail 28 and the working surface of the heat seal bar 29 are clamped and is transverse-sealed.

In facing face against the counter rail 28 in the heat seal bar 29, the first, the second induction heaters 31, 32 are disposed, having predefined intervals up and down, facing the packaging material 10 and having convex projection 77. The first, the second induction heaters 31, 32 have tube-shape capable of passing cooling water in the heaters.

The packaging material 10 has a laminate structure comprising of a polyethylene layer an aluminum foil layer, an adhesive layer, a paper substrate and a polyethylene layer in order to outside from inside of the formed packaging container.

The packaging material 10 is clamped with the counter rail 28 and the heat seal bar 29 and is sealed transversally by advancing forward the packaging material 10 each other.

The packaging materials 10 in two sheets are clamped with the counter rail 28 and the heat seal bar 29, and is heated by impressing seal voltage to the first, the second induction heaters 31, 32 with convex projections 77 through a controller (not shown in figures) of the heating section.

The innermost polyethylene layer in the first portion 10a and the innermost polyethylene layer in the second portion 10b of the packaging material 10 are pushed and melted each other mainly in area corresponding to the first, the second induction heaters 31, 32.

Impressing of the seal voltage to the first, the second induction heaters 31, 32 is stopped and the corresponding portion of the first, the second induction heaters 31, 32 are cooled.

A seal portion S comprising of the first, the second transverse sealing portion S1, S2 are formed in the portion corresponding to the first, the second induction heaters 31, 32 in the first portion 10a and the second portion 10b.

The seal section S is cut with a cutter section 50, and each container is formed. The cutter section comprises the cutter 51 built-in to counter rail 28 and the counter cutter 53 built-in to heat seal bar 29.

The counter cutter is formed with elastic material such as soft rubber, hard rubber, a synthetic resin, synthesis flexible material, nature flexible material and is mounted by a holding part to hold the counter cutter.

According to the invention, the counter cutter is held holding section provided on the surface of the heat seal bar or counter rail. In the embodiment, the counter cutter projects from the working surface of the heat seal bar 29 with a sectional chevron shape.

When a cutter cuts packaging material 10 (10a and 10b), due to pressure from the counter rail 28 and the heat seal bar 29 for transverse sealing to packaging material 10 and due to back pressure of elasticity of the counter cutter corresponding to packaging material 10 of cutter section 55, the contents liquid is squeezed out and stagnant liquid is not generated between packaging material 10a and 10b near to the counter cutter 53.

In addition, the counter cutter can control abrasive wear, damage of the point of cutter 51 as much as possible because the shock can be kept in minimum due to the resiliency cushioning material when the point of cutter 51 hits the resiliency cushioning material in the step of cutting the packaging material 10 (10a and 10b) by cutter 51 mounted by the holding part to hold counter cutter. Therefore, a lifetime of the cutter can be protected for long time.

Figure 2:
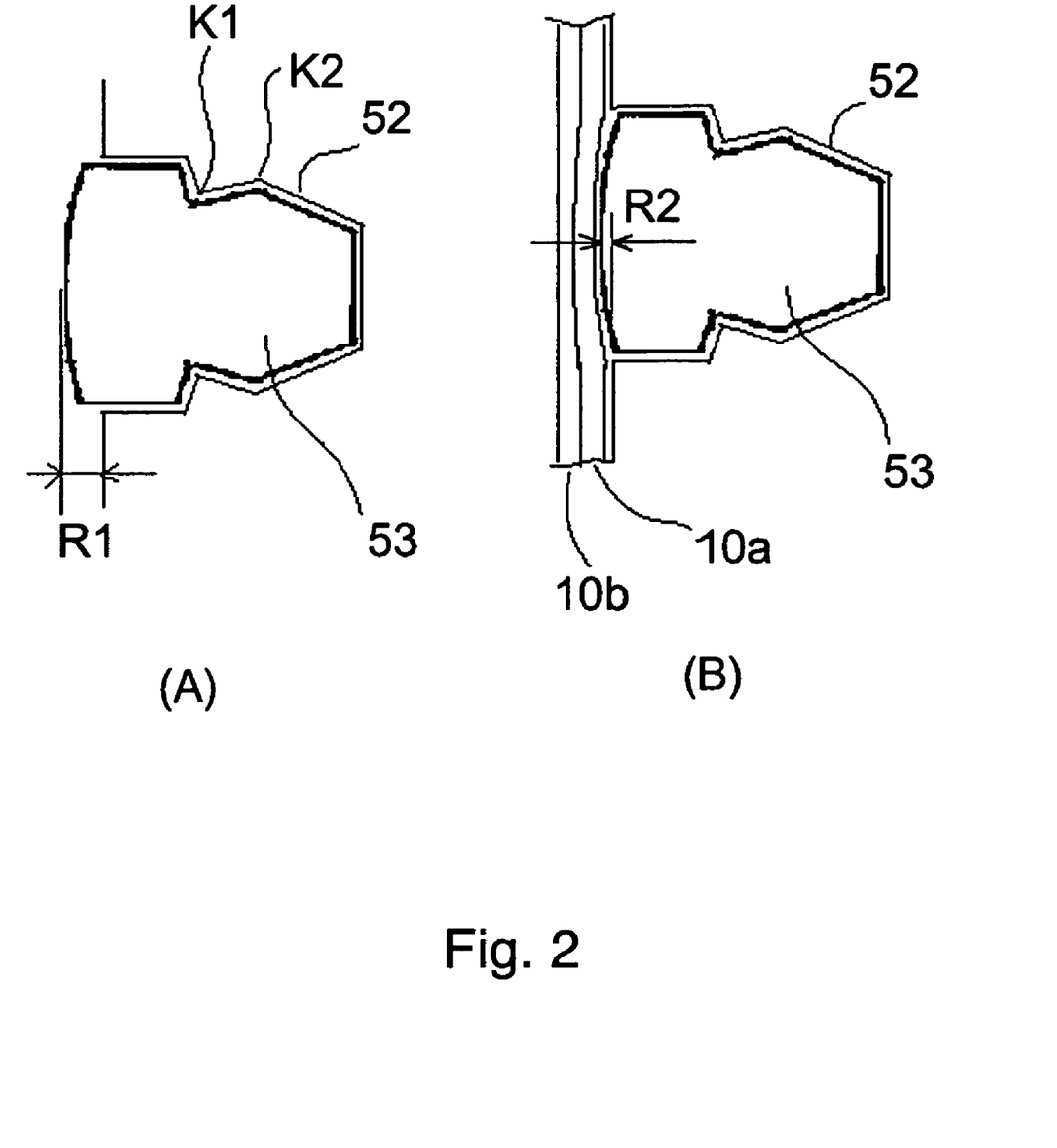
FIG. 2 is a detailed section view of the cutter counter in the embodiment of this invention.

With FIG. 2, moreover, the counter cutter is described in detail. FIG. 2 (A) shows a condition of the counter cutter before the packaging material 10 is pressed by the counter rail 28 and the heat seal bar 29. FIG. 2 (B) shows a condition of the counter cutter when the packaging material 10 is pressed down by the counter rail 28 and the heat seal bar 29 for the transverse sealing.

In the figures, R1, R2 are the length that each counter cutter projects from holding section. As shown the following, elastic repulsive force P equivalent to displacement length of R1-R2 is generated.

$$P = E \times S (R1-R2)/Q$$

E: Elastic modulus
S: Cross section of a displacement section of a counter cutter Moreover, according to other embodiment of invention, as shown in FIG. 2, a K1 part of the holding part of the cutter counter becomes smaller than K2 part, and the cutter counter is held along fitting.

Because the counter cutter is easily exchanged if necessary, labor and time for exchange can be minimized.

In addition, this invention is not limited to the above-mentioned embodiment, potentially various modification based on the spirit of this invention will be not excluded from the scope of this invention.

Figure 7:
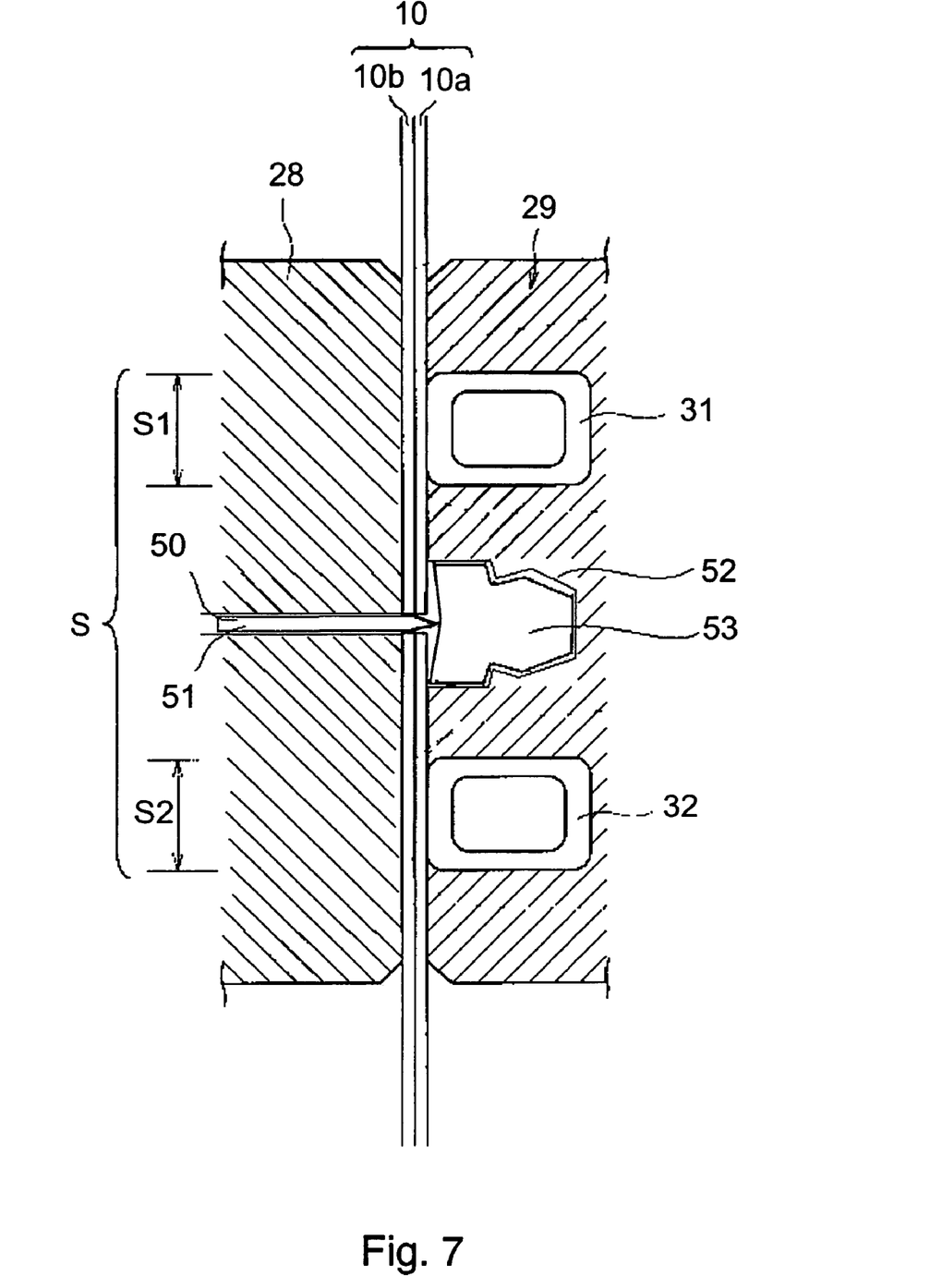
FIG. 7 is a sectional view showing the cutting function of the cutter section according to another embodiment of this invention.

As shown in FIG. 7, for example, the working surface of the heat seal bar 29 may be flat for the heat seal bar without the projection.

As shown in FIG. 7, the point of the cutter 51 is protected from the wear damage because the shock can be kept in low-level by deformation of the elastic counter cutter after the cutter 51 cuts the packaging material 10 (10a and 10b).

The method of heat seal may include supersonic wave heating and resistance heating as well as induction heating.

Figure 8:
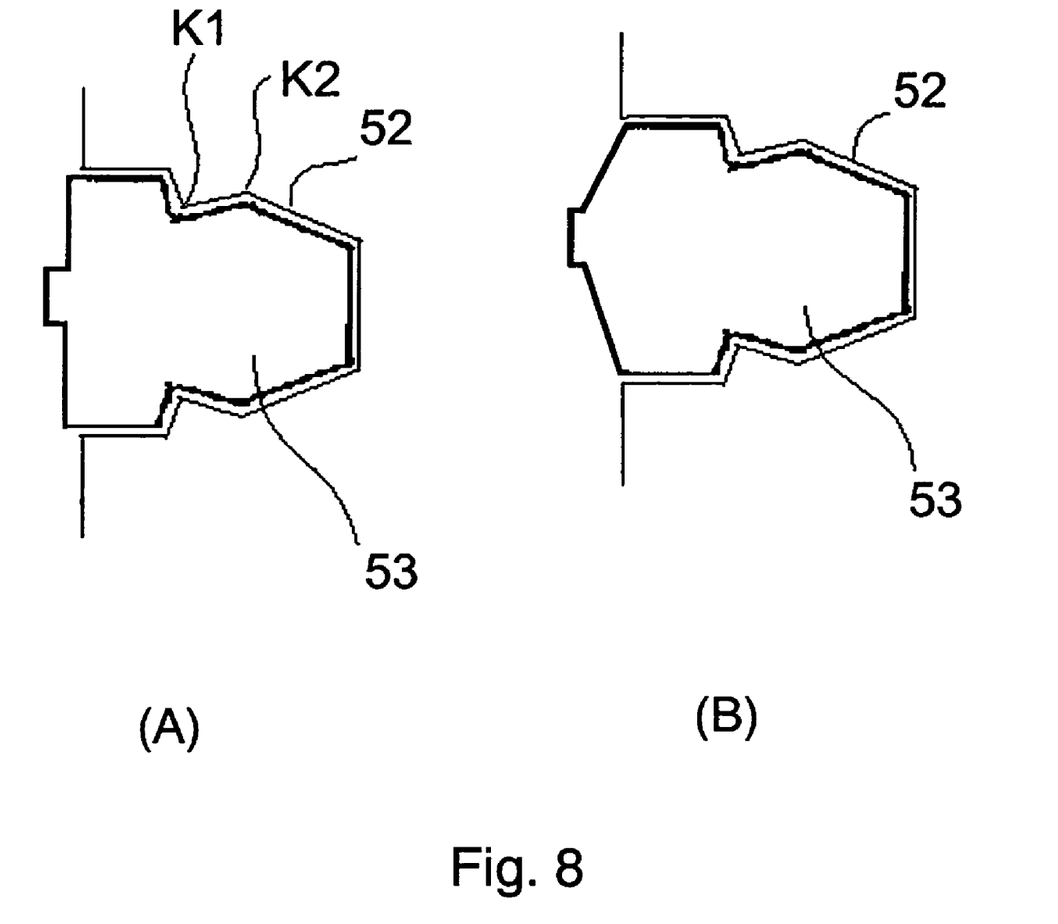
FIG. 8 is a sectional view of a cutter counter according to other embodiment of this invention.

The sectional shape includes, as shown in FIG. 8 (A), the embodiment that the counter cutter projects from the working surface with a sectional rectangle shape and as shown in FIG. 8 (B), the embodiment that the counter cutter projects from the working surface with a sectional rectangle shape and inclined surfaces.

As above-mentioned, the packaging material is hygienic because the stagnant liquid does not stay in the seal portion.

Scattering and container wall pollution of the contents from the stagnant liquid are prevented at the timing of cutting, and the container can be formed well. Moreover, with the counter cutter of elastic material, a life-time of the cutter can be protected for along time.

A counter cutter is held by fitting in the holding section.

Therefore, everyone can desorbs with the counter cutter easily.

Figure 9:
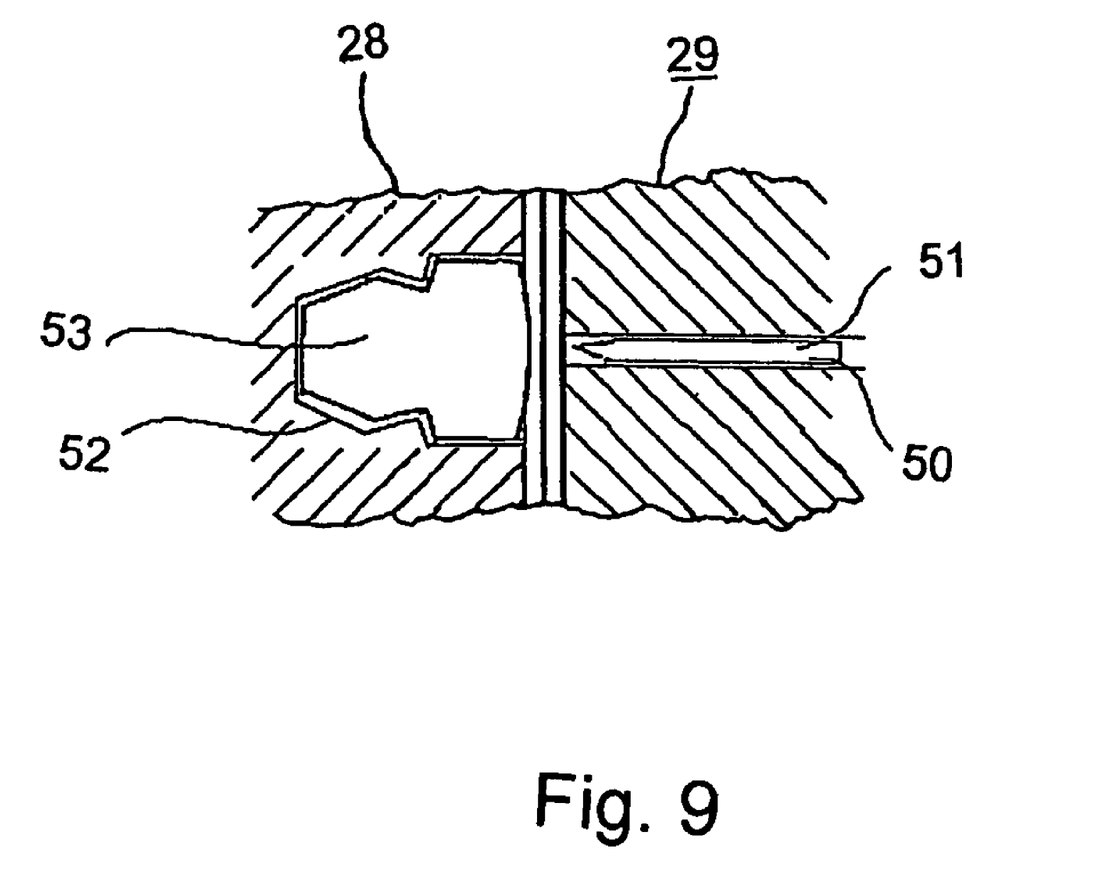
FIG. 9 is a partial cross-sectional view of a portion of the heat seal bar and counter rail showing an alternative positioning of the cutter and counter cutter.

A holding part arranged in a working surface of the counter rail as an embodiment which is reverse to the above-mentioned embodiment can hold a counter cutter as generally shown in FIG. 9.

INDUSTRIAL APPLICABILITY

The seal apparatus of this invention are used to a machine packaging and filling a container packing liquid food, such as cow milk, soft drink and like.

The invention claimed is:

1. A sealing apparatus for sealing packaging material comprising
    a heat seal jaw;
    a heat seal bar provided at a front edge of the heat seal jaw, with two spaced apart heaters arranged in parallel and mounted in the heat seal bar, the heat seal bar having a working surface that contacts the packaging material during sealing of the packaging material;
    a counter jaw disposed oppositely to the heat seal jaw;
    a counter rail provided on said counter jaw and having a working surface that contacts the packaging material during sealing of the packaging material;
    drive means for advancing/retracting the heat seal jaw and counter jaw relatively;
    heating means for actuating the heaters while clamping the packaging material between the working surface of the heat seal bar and the working surface of the counter rail to form two spaced apart transverse sealed portions in the packaging material;
    a cutter section comprising a cutter disposed at a position between the two heaters and a resilient counter cutter;
    the resilient counter cutter being held by a holding section of the heat seal bar, the holding section being defined by a recess in the heat seal bar in which is positioned the resilient counter cutter, the resilient counter cutter possessing a front surface which contacts the packaging material when the packaging material is clamped between the working surface of the heat seal bar and the working surface of the counter rail;
    the cutter being mounted on the counter rail to cut the packaging material clamped by the working surfaces of the heat seal bar and the counter rail, the cutter being positioned in opposing relation to the resilient counter so that during cutting of the packaging material clamped by the working surfaces of the heat seal bar and the counter rail the cutter contacts a portion of the front surface of the resilient counter cutter; and
    the front surface of the resilient counter cutter, including the portion of the front surface of the resilient counter cutter contacted by the cutter during the cutting of the packaging material, projecting beyond the working surface of the heat seal bar in a direction towards the counter rail, the working surface of the heat seal bar beyond which the front surface of the resilient counter cutter projects towards the counter rail including a portion of the working surface of the heat seal bar immediately adjoining the recess in the heat seal bar.

2. A sealing apparatus as defined in claim 1, wherein the resilient counter cutter is made of rubber.

3. A sealing apparatus as defined in claim 1, wherein the resilient counter cutter is made of synthetic resin.

4. A sealing apparatus as defined in claim 1, wherein a front portion of the resilient counter cutter projecting beyond the working surface of the heat seal bar possesses a chevron cross-sectional shape.

5. A sealing apparatus as defined in claim 1, wherein a front portion of the resilient counter cutter projecting beyond the working surface of the heat seal bar possesses a rectangular cross-sectional shape.

6. A sealing apparatus for sealing packaging material comprising
    a heat seal jaw;
    a heat seal bar provided at a front edge of the heat seal jaw, with two spaced apart heaters arranged in parallel and mounted in the heat seal bar, the heat seal bar having a working surface that contacts the packaging material during sealing of the packaging material;
    a counter jaw disposed oppositely to the heat seal jaw;
    a counter rail provided on said counter jaw and having a working surface that contacts the packaging material during sealing of the packaging material;
    drive means for advancing/retracting the heat seal jaw and counter jaw relatively;
    heating means for actuating the heaters while clamping the packaging material between the working surface of the heat seal bar and the working surface of the counter rail to form two spaced apart transverse sealed portions in the packaging material;

a cutter section comprising a cutter disposed at a position between the two heaters and a resilient counter cutter;

the resilient counter cutter being held by a holding section of the counter rail, the holding section being defined by a recess in the counter rail in which is positioned the resilient counter cutter, the resilient counter cutter possessing a front surface which contacts the packaging material when the packaging material is clamped between the working surface of the heat seal bar and the working surface of the counter rail;

the cutter being mounted on the heat seal bar to cut the packaging material clamped by the working surfaces of the heat seal bar and the counter rail, the cutter being positioned in opposing relation to the resilient counter so that during cutting of the packaging material clamped by the working surfaces of the heat seal bar and the counter rail the cutter contacts a portion of the front surface of the resilient counter cutter; and the front surface of the resilient counter cutter, including the portion of the front surface of the resilient counter cutter contacted by the cutter during the cutting of the packaging material, projecting beyond the working surface of the counter rail in a direction towards the heat seal bar, the working surface of the counter rail beyond which the front surface of the resilient counter cutter projects towards the heat seal bar including a portion of the working surface of the counter rail immediately adjoining the recess in the counter rail.

7. A sealing apparatus as defined in claim 6, wherein a front portion of the resilient counter cutter projecting beyond the working surface of the counter rail possesses a chevron cross-sectional shape.

8. A sealing apparatus as defined in claim 6, wherein a front portion of the resilient counter cutter projecting beyond the working surface of the counter rail possesses a rectangular cross-sectional shape.

9. A sealing apparatus as defined in claim 6, wherein the resilient counter cutter is made of rubber.

10. A sealing apparatus as defined in claim 6, wherein the resilient counter cutter is made of synthetic resin.

* * * * *